United States Patent
Ueda

[11] Patent Number: 5,727,879
[45] Date of Patent: Mar. 17, 1998

[54] WASTE DECOMPOSITION TREATMENT APPARATUS

[75] Inventor: Susumu Ueda, Kawaguchi, Japan

[73] Assignee: Daiwa Co., Ltd., Tokyo, Japan

[21] Appl. No.: 710,705

[22] Filed: Sep. 20, 1996

[30] Foreign Application Priority Data

Mar. 21, 1996 [JP] Japan ............... 8-065012

[51] Int. Cl.$^6$ ............................................. B01F 13/00
[52] U.S. Cl. .................................................. 366/271
[58] Field of Search ............................ 366/186, 241, 366/261, 271, 342, 343, 345, 346, 349; 198/533

[56] References Cited

U.S. PATENT DOCUMENTS

| | | | |
|---|---|---|---|
| 1,880,284 | 10/1932 | Schenk | 366/271 |
| 2,340,783 | 2/1944 | Wegner | 198/533 X |
| 3,323,896 | 6/1967 | Brown | 366/261 X |
| 4,377,258 | 3/1983 | Kipp, Jr. | 366/345 X |
| 5,387,036 | 2/1995 | Hagen et al. | 366/345 X |

FOREIGN PATENT DOCUMENTS

| | | | |
|---|---|---|---|
| 184144 | 12/1955 | Germany | 366/346 |
| 63-267426 | 11/1988 | Japan | |
| 2-164785 | 8/1990 | Japan | |
| 4-108528 | 4/1992 | Japan | 366/271 |
| 5-20882 | 8/1993 | Japan | |
| 5-317675 | 12/1993 | Japan | |
| 6-92765 | 4/1994 | Japan | |
| 6-127601 | 5/1994 | Japan | |
| 07033568 | 2/1995 | Japan | |
| 08012005 | 1/1996 | Japan | |

*Primary Examiner*—Charles E. Cooley
*Attorney, Agent, or Firm*—Deveau, Colton & Marquis

[57] ABSTRACT

An organic waste decomposition treatment apparatus, wherein agitation vanes of flight members are rotatably attached to looped chains, so as to churn and ferment organic waste accumulated within a reservoir vat when the chain is rotationally driven, then be pushed towards an interior of the agitator by a push-down scraper which is positioned outside of the agitator at a back side of the agitator with respect to the direction of advancement, so as to eliminate contact resistance between the agitator and the organic waste at the back side of the agitator. It is thereby possible to make the agitator smaller and less expensive, and the decomposition treatment efficiency of organic waste is able to be increased.

5 Claims, 7 Drawing Sheets

WASTE DECOMPOSITION TREATMENT APPARATUS

BACKGROUND OF THE INVENTION

1. Technical Field of the Invention

The present invention relates to waste decomposition treatment apparatus for fermentation treating organic waste such as livestock excrement, household garbage, and raw sewage.

2. Background Art

FIG. 8 shows an example of the structure of a conventional waste decomposition treatment apparatus for treating organic waste such as excrement and decomposable garbage. In this waste decomposition treatment apparatus 100, a reservoir vat 50 comprises outer walls 50A, having a rectangular shape in plan view, between which waste accumulates; an intermediary partition wall 50B extending in a longitudinal direction at a central portion thereof; and guides 51 provided extending in a horizontal direction (indicated by the double-headed arrow A-B) on top of the pair of outer walls 50A. A drive frame 54 is driven along the guides 51 by means of a drive motor 52. The drive frame 54 is equipped with an agitator 56 having agitation vanes 55 which churn the organic waste M so that the waste at the bottom is brought to the surface in order to allow fermentation treatment. The agitation vanes 55 are driven by an agitation motor 57 provided in the agitator 56.

Additionally, a rotational rail 58 which supports the agitator 56 so as to allow movement along the double-headed arrow C-D on a horizontal plane, and a rotational motor 59 which drives the agitator 56 along the rotational rail 58 in the C direction are provided on top of the drive frame 54.

The waste decomposition treatment apparatus 100 with the above-mentioned structure operates as follows.

(i) As the drive frame 54 is driven in the A direction by means of the drive motor 52, the agitation vanes 55 of the agitator 56 are rotated in the direction of arrow (1) by means of the agitation motor 57. Consequently, the agitator 56 is able to advance in the A direction while agitating the organic waste M in the reservoir vat 50.

(ii) When the drive frame 54 reaches the end of the vat in the A direction (as shown in FIG. 8), the operation of the drive motor 52 and the agitation motor 57 is momentarily halted, then the rotational motor 59 is operated so that the agitator 56 on the drive frame 54 is rotated 180° in the C direction.

(iii) While the drive frame 54 is driven in the B direction by means of the drive motor 52, the agitation vanes 55 are rotated in the (1) direction by driving the agitation motor 57. As a result, the agitator 56 travels in the B direction while simultaneously agitating the organic waste M in the reservoir vat 50.

(iv) When the drive frame 54 reaches the end of the vat in the B direction, the operation of the drive motor 52 and the agitation motor 57 is momentarily halted, then the rotational motor 59 is operated so that the agitator 56 on the drive frame 54 is rotated 180° in the C direction.

By repeatedly performing the procedures of (i)-(iv) given above, the agitator 56 is driven in a single direction around the intermediary partition wall 50B of the reservoir vat, so that the organic waste M within the reservoir vat is continuously fermented.

However, the above-described waste decomposition treatment apparatus 100 has drawbacks in that the agitation efficiency can be reduced because the amount of organic waste M sticking to the agitation vanes 55 can increase as fermentation progresses, and unnecessary drive resistance can occur because the agitator 56 agitates organic waste M behind or below the direction of advancement.

That is, the organic waste M treated by the apparatus 100 contains water which causes it to tend to stick to the agitation vanes 55, but since the amount of organic waste M which is agitated by the agitation vanes 55 decreases if the amount adhering increases, the agitated amount decreases with the amount the agitator 56 is driven. The procedure to remove organic waste M stuck to the agitation vanes requires a significant amount of labor; therefore, an efficient remedy to this problem has been sought.

Additionally, while the object of the apparatus 100 is to agitate the organic waste M ahead of the direction of advancement of the agitator 56, the organic waste M behind and below the direction of advancement is also agitated because the agitator 56 is normally buried within the organic waste M, thereby increasing the unnecessary drive resistance and reducing the agitation efficiency. Additionally, the apparatus 100 must be enlarged overall in response to the increase in drive resistance, because the strength required of the agitator 56 and the structures required to support the agitator 56 must be increased, and the power outputs of the drive motor 52 and the agitation motor 57 must be increased.

SUMMARY OF THE INVENTION

In consideration of the above, the present invention has as an object the reduction of the drive resistance of agitators so as to increase the agitation fermentation efficiency of organic waste M and the provision of an organic waste decomposition treatment apparatus which can be miniaturized overall. In order to achieve the above-mentioned objects, the present invention offers an organic waste decomposition treatment apparatus, comprising a reservoir vat for storing organic waste; and an agitator for moving within the reservoir vat and churning organic waste which has been conveyed to the reservoir vat for fermentation; the agitator comprising pairs of mutually spaced sprockets, loop members wrapped around the sprockets, and a flight conveyor having flight members rotatably attached at a plurality of locations along the rotational circumference of the loop members to shafts which are parallel to a rotational axis of the loop members; and the flight members comprising agitation vanes for churning the organic waste by extending outwards from the loop members, and contact members affixed at an angle to the agitation vanes; wherein, during rotation of the loop members, the contact members contact extension scrapers positioned inside a circuit path of the flight members at a front side with respect to a direction of advancement of the agitator so as to rotate and force the agitation vanes outward, and the agitation vanes contact push-down scrapers positioned outside a circuit path of the flight members at locations aside from a front side of a direction of advancement of the agitator so as to rotate and push down the agitation vanes inside the circuit path.

In the present invention, the flight members, which are moved to the front side of the agitator with respect to the direction of advancement with the rotational motion of the loop members, are rotated when the contact members come into contact with the extension scrapers, so that the agitation vanes are thrust outwards and are prepared to churn the organic waste. At this time, the contact members are approximately parallel, to the circuit path of the flight members.

After passing through the front side of the agitator with respect to the direction of advancement, the flight members are rotated due to contact between the agitation vanes and the push-down scrapers, so that the agitation vanes are pushed down toward the circuit path of the flight members and become approximately parallel to the loop members. As a result, the agitator does not churn the organic waste around the agitator which is not on the front side of the direction of advancement of the agitator, so that the amount of unnecessary contact resistance is reduced. Additionally, since the front surfaces of the agitation vanes with respect to the direction of movement come into contact with the push-down scrapers, the push-down scrapers are able to remove organic waste which has become stuck to the agitation vanes during contact. Consequently, the present invention is able to allow agitators to be smaller and less expensive, while increasing the decomposition treatment efficiency of organic waste.

The contact members are made to protrude inside the circuit path of the flight members when the agitation vanes are pushed down, so that they are able to come into contact with the extension scrapers when the flight members approach the vicinity of the extension scrapers.

PREFERRED EMBODIMENTS OF THE INVENTION

Hereinbelow, the waste decomposition treatment apparatus 1 according to the best mode of the present invention will be explained with reference to FIGS. 1-6.

Figure 1:
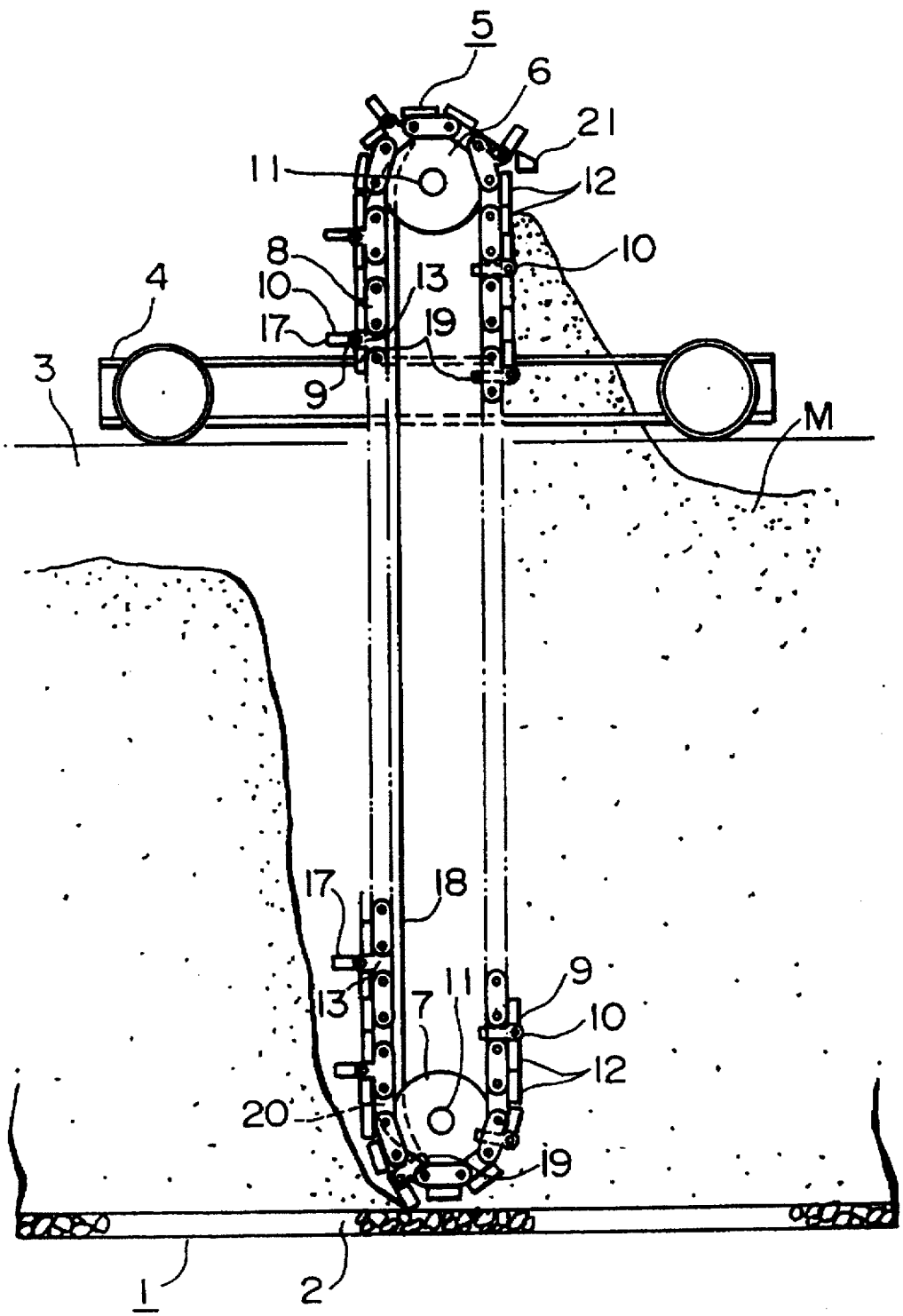
FIG. 1 is a side elevation view showing a simplified structure of a waste decomposition treatment apparatus according to the present invention.

AS shown in. FIG. 1, the waste decomposition treatment apparatus 1 comprises a reservoir vat 2 wherein organic waste M accumulates, and an agitator 5 hanging into the reservoir vat 2 from a drive member 4 which travels along the top of the outer wall 3 of the reservoir vat 2. The agitator 5 is driven as it is moved around the reservoir vat 2 by the drive member 4, as a result of which the organic waste M in the reservoir vat 2 is agitated and fermented.

The agitator 5 is explained in detail below.

Figure 2:
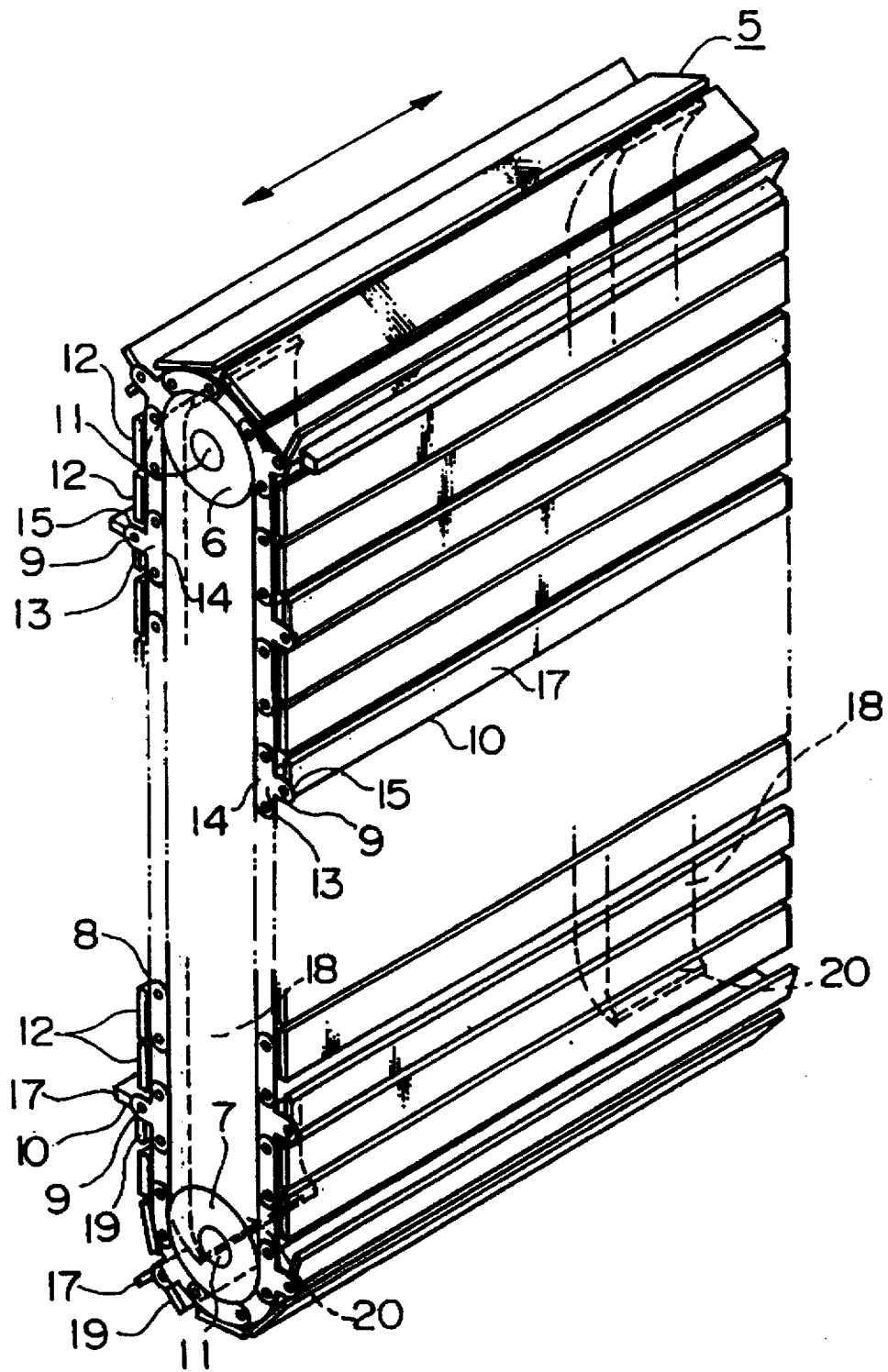
FIG. 2 is a perspective view of the agitator of the waste decomposition treatment apparatus of FIG. 1.

As shown in FIGS. 1 and 2 the agitator 5 comprises pairs of sprockets 6 and 7 which are spaced apart in the vertical direction, chains 8 looped therebetween, and flight members 10 which are rotatably attached by means of shafts 9 oriented parallel to the rotational axis of the chains 8 at a plurality of positions along the rotational direction of the chains 8. The sprockets 6 and 7, which are respectively attached at both ends of horizontally positioned drive shafts 11, engage with a pair of mutually parallel looped chains 8 positioned at either end in the lateral direction (the direction of the double-headed arrow in FIG. 2) of the agitator 5. These chains 8 are driven by means of a drive force transmitted through the drive shafts 11.

A plurality of connector panels 12 and flight members 10 are consecutively attached to form a connection between the chains 8. The connector panels 12 are attached in consecutive pairs in the rotational direction of the chains 8, and the flight members 10 are attached between the pairs of connector panels. The boundary between each pair of consecutive connector panels is aligned with portion of the chains 8 which are pin-coupled so as to allow bending in times of flexure. Since the pin-coupled portions of the chains 8 are aligned in the lateral direction, the connector panels 12 are also mutually displaced in response to the bending of the chains 8 when the chains 8 pass along the sprockets 6 and 7. Consecutive connector panels 12 should be sufficiently spaced so as to allow mutual displacement therebetween, but should also be close enough as to nearly touch.

Figure 6:
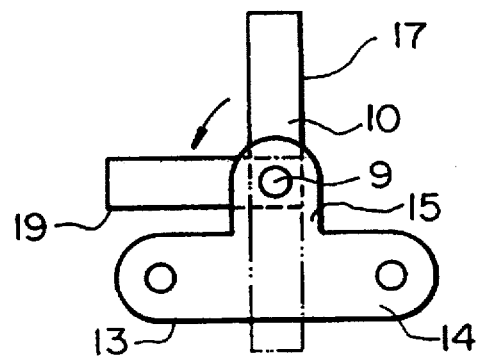
FIG. 6 is an enlarged side elevation view of a bracket for supporting a flight member.

Connector brackets 13 are coupled at portions of the chains for connecting the end portions of the flight members 10. As shown in FIG. 6, these connector brackets 13 are T-shaped elements having a main body portion 14 for coupling the ends of the chains 8 and a bracket portion 15 which protrudes outward from this main body portion 14. The flight members 10 are rotatably supported along horizontal axes by means of attachment shafts 9 at the tips of the bracket portions 15. The area 10a allowed for attachment of each of the flight members 10 is identical to the area provided for each connector panel 12. The shafts 9 axially support the flight members 10 at positions shifted toward the front side of the rotational direction (clockwise in FIG. 2) of the chains 8 in the area 10a.

Each flight member 10 has an L-shaped cross-section and is axially supported by means of shafts 9 at the bent portion thereof. The flange on one end functions as an agitation vane 17 for churning the organic waste M. The other flange on the flight member 10, which is oriented either parallel to the chains 8 or facing inward from the chains 8, functions as a contact member 19 which forces the agitation vane 17 to move outward by coming into contact with an extension scraper 18 which is positioned to the interior of the circuit path of the flight members 10 at a front side of the direction of advancement of the agitator 5 when the chain 8 is rotationally driven.

The agitation vanes 17 and the contact members 19 are formed with the same dimensions, such that they are able to be raised and retracted along the same plane as the connector panels 12 by means of the rotation of the flight members 10. Additionally, the agitation vanes 17 and the contact members 19 are formed so as to almost completely cover the attachment areas 10a of the flight members 10 when they are parallel to the connector panels 12.

Figure 3:
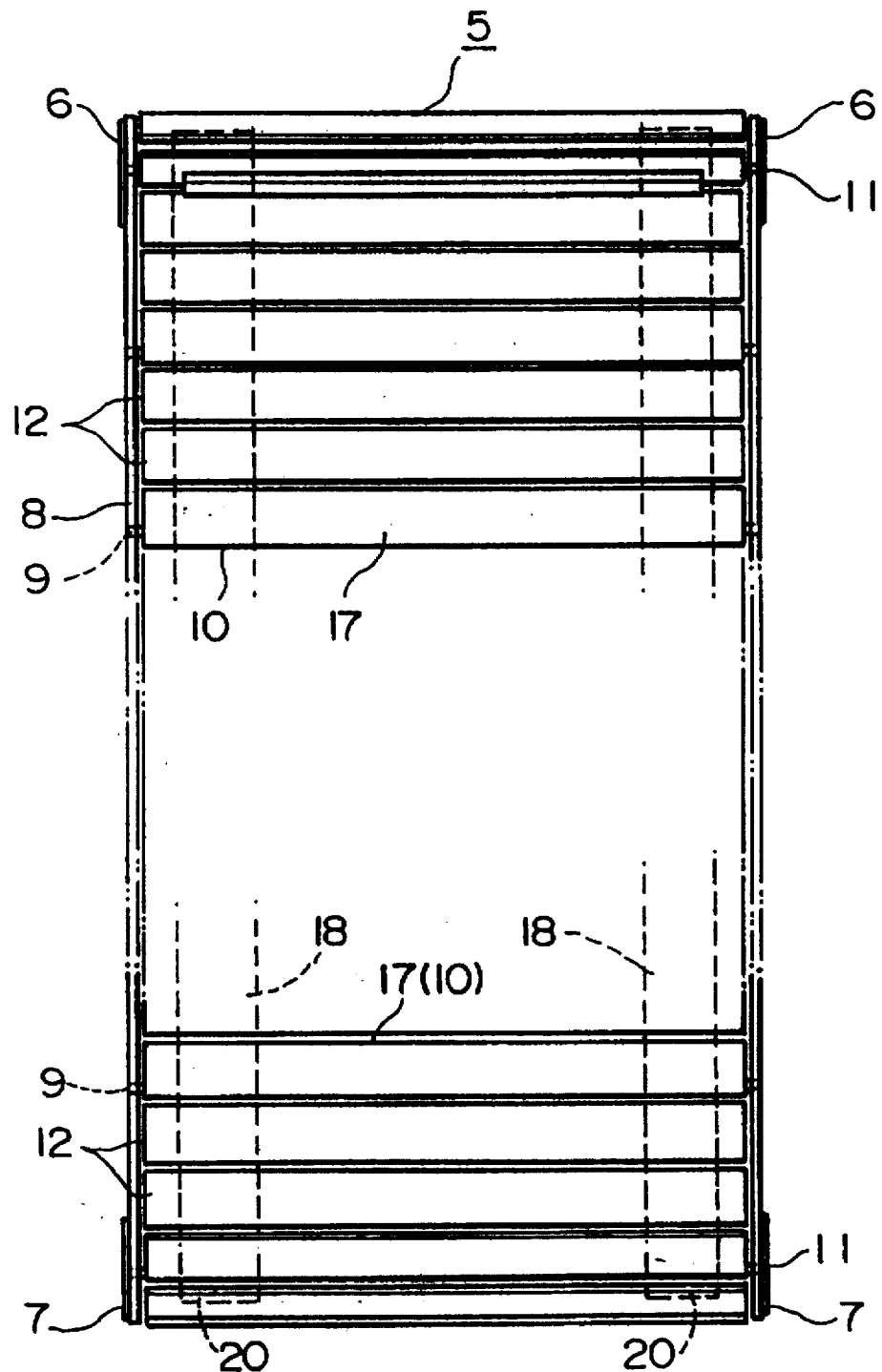
FIG. 3 is a front elevation view of the agitator of FIG. 2.
Figure 4:
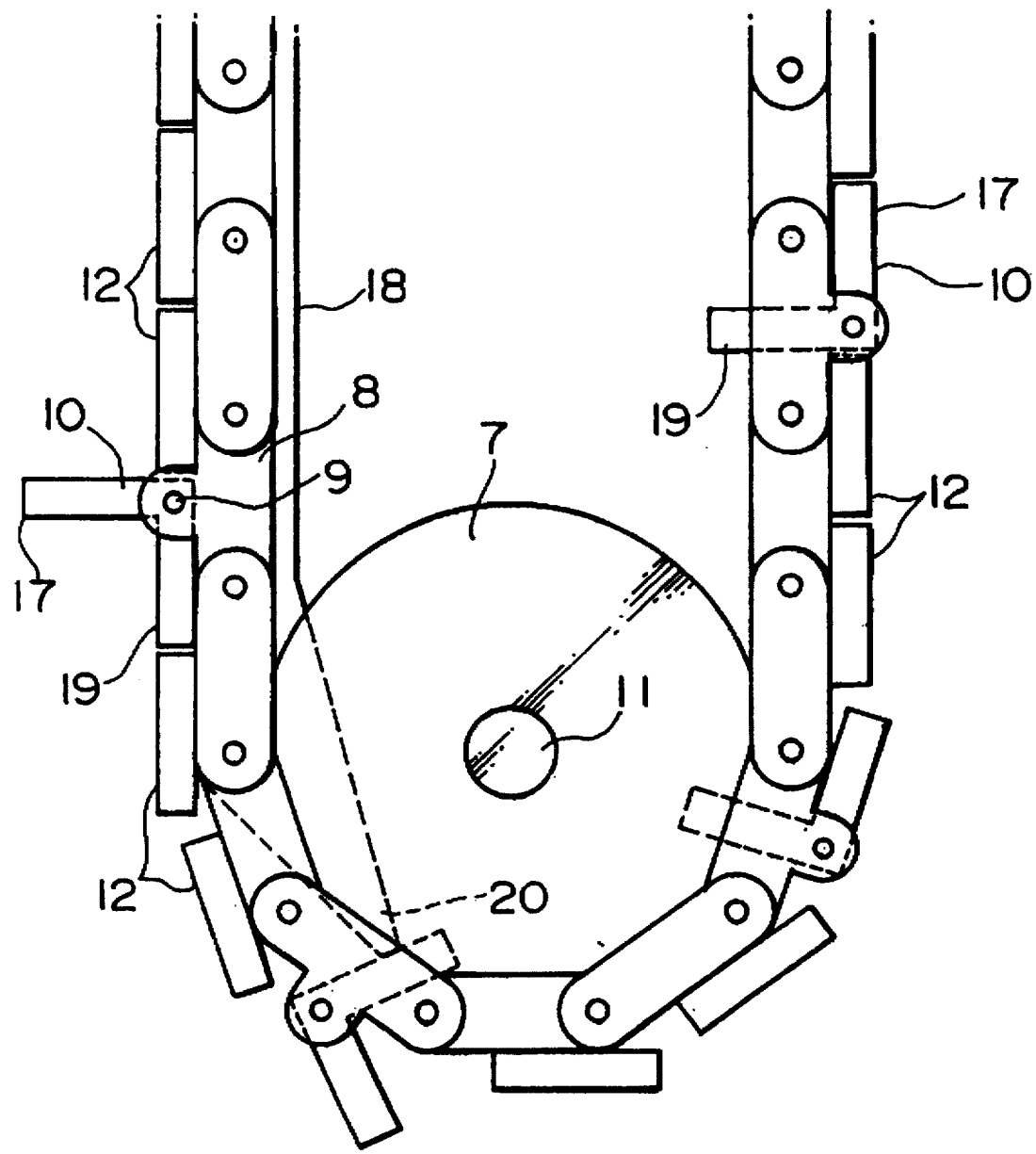
FIG. 4 is a side elevation view of a bottom portion of the agitator of FIG. 2.

As shown in FIGS. 2 and 3, the extension scrapers 18 are sleigh-shaped plates which are positioned along each chain 8 at the front side of the direction of advancement of the agitator 5. Additionally, the extension scrapers 18 extend over the entire distance between the upper and lower drive shafts 11, and are positioned so that their entire lengths lie very close to the circuit paths of the flight members 10 passing in the front side of the direction of advancement of the agitator. As shown in FIGS. 2 and 4, the end portion 20 of each extension scraper 18, which is positioned close to the lower sprocket 7, comes into contact with the contact members 19 of the flight members 10 which advance forward from the back side of the direction of advancement of the agitator by means of the rotational motion of the chain 8, thereby pushing the agitation vanes 17 outward as the flight members 10 rotate in a clockwise direction. The extension scrapers 18 are positioned near the circuit paths of the flight members 10 so that the contact members 19 are made co-planar with the connector panels 12 when they come into contact with the end portions 20 of the extension scrapers 18. Additionally, the contact members continually maintain sliding contact with the extension scraper 18 while passing in the front side of the direction of advancement of the agitator 5, so as to prevent the flight member from rotating counterclockwise, and maintain the agitation vanes 17 in a protruding state.

Figure 5:
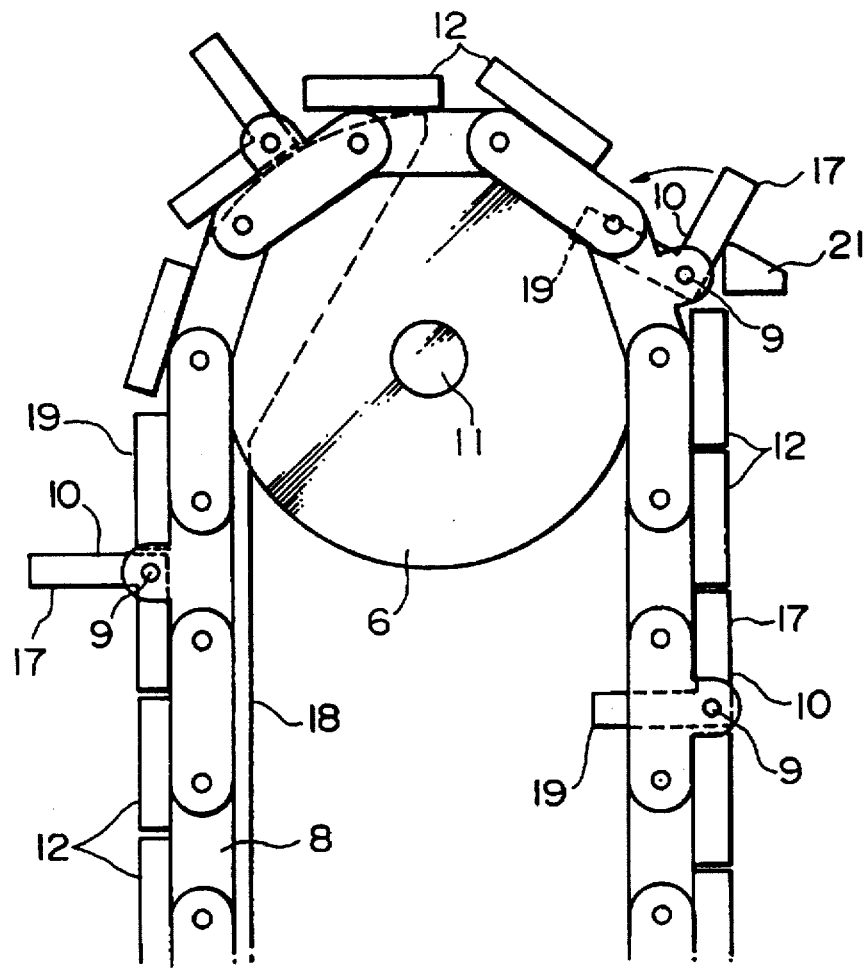
FIG. 5 is a side elevation view of a top portion of the agitator of FIG. 2.

As shown in FIGS. 1 and 5, around the upper socket 6, the flight members 10 are rotated in a counterclockwise direction (the direction of the arrow in FIG. 5) due to the agitation vanes 17 of the flight members coming into contact with push-down scrapers 21 which push the agitation vanes 17 in the inward direction of the agitator 5 so as to become parallel with the chain 8. The push-down scrapers 21, which are positioned at outer sides of the circuit path of the flight members 10, rotate the flight members 10 by contacting the agitation vanes 55 which advance from the front side to the back side of the direction of advancement of the agitator 5 by means of the rotational motion of the chain 8 while still protruding outward. After rotation, the agitation vanes 55 of the flight members 10 become co-planar with the connector panels 12.

The utility and effects of the present invention will be explained in detail below.

The waste decomposition management apparatus 1 of the present invention continuously churns and ferments the organic waste M which accumulates in the reservoir vat 2 by moving the agitator 5 by driving the drive frame 4 while rotating the chains 8 in the clockwise direction as seen in FIGS. 1 and 2.

When the chains 8 are rotationally driven, the flight members 10 which advance toward the front side from the back side of the direction of advancement of the agitator 5 near the bottom sprockets 7 are rotated in a clockwise direction due to the contact members 19 facing towards the interior of the agitator 5 coming into contact with the end portion 20 of the extension scraper 18. In this way, the contact members 19 are made co-planar with the connector panels 12 while the agitation vanes 17 are extended outwards.

While the flight members 10 are moved to the front side of the direction of advancement of the agitator 5 with the rotation of the chains 8, the contact members 19 maintain sliding contact with the extension scrapers 18 until the flight members 10 reach the vicinity of the upper sprocket 6. Thus, the flight members 10 are prevented from rotating in a counterclockwise direction and the state of protrusion of the agitation vanes 17 against the contact resistance of the organic waste M is maintained so that the agitation vanes 17 churn the organic waste M upwards. At this time, the attachment regions 10a of the flight members 10 are blocked by the contact members 19, so that the organic waste M is prevented from entering the interior of the agitator 5.

After the flight members 10 have passed the front side of the direction of advancement of the agitator 5, the agitation vanes 17 contact the push-down scrapers 21 to be rotated in a counterclockwise direction. As a result, the contact members 19 are made to face toward the interior of the agitator 5 and the agitation vanes 17 are pushed down to become co-planar with the connector panels 12. At this time, any of the organic waste M which is stuck to the agitation vanes 17 when the agitation vanes 17 contact the push-down scrapers 21 can be scraped off by the push-down scrapers 21 by positioning the push-down scrapers 21 so as to contact the base portions of the agitation vanes 17. Additionally, since the flight members 10 which are coupled to the chains 8 sequentially contact the push-down scrapers 21 due to the rotation of the chains 8, the organic waste M can be removed from all of the flight members 10 automatically, so that there is no need for any separate removal procedures.

On the back side of the direction of advancement of the agitator 5, the part of the flight member 10 which extends outward is eliminated by being pushed down by the agitation vanes 17. Furthermore, the attachment regions 10a of the flight members 10 are blocked by the agitation vanes 17, so that the contact resistance with the organic waste M around the agitator 5 is largely reduced. Moreover, the contact resistance between the organic waste M and the agitator 5 can also be largely reduced in the lower portion of the agitator 5, because the agitation vanes 17 are not extended outwards until the contact members 19 again contact the extension scrapers 18. Consequently, the drive force of the agitator 5 is used only for churning the organic waste M on the front side of the direction of advancement, so as to make it possible to miniaturize the drive mechanism of the agitator 5 and simplify the support structure for supporting the reaction force which acts on the agitator 5 during agitation. Therefore, the organic waste decomposition treatment apparatus 1 can be made smaller and at lower cost.

Figure 7:
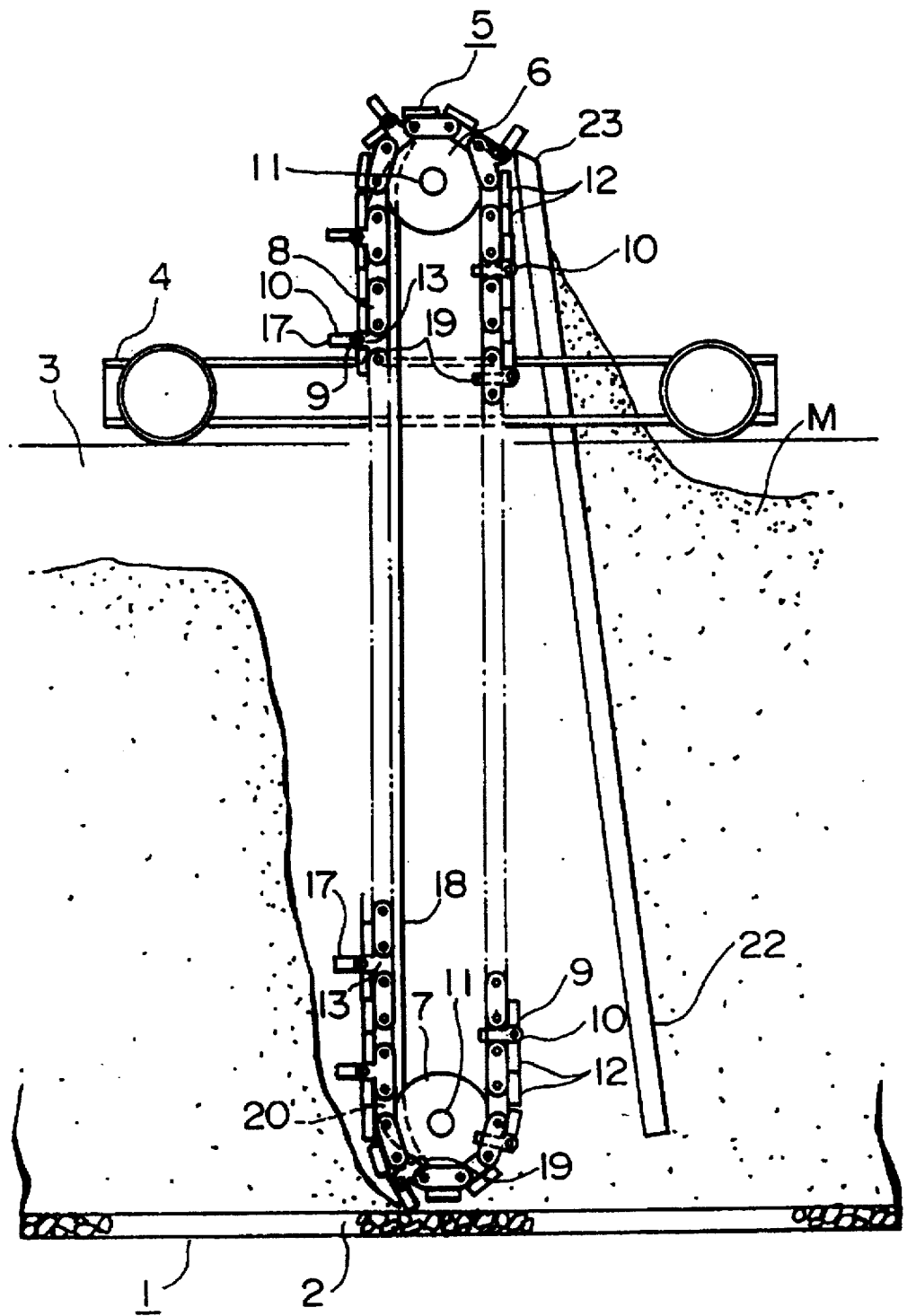
FIG. 7 is a side elevation view of an embodiment wherein a pressure receiving board has been attached to the agitator of FIG. 2.
Figure 8:
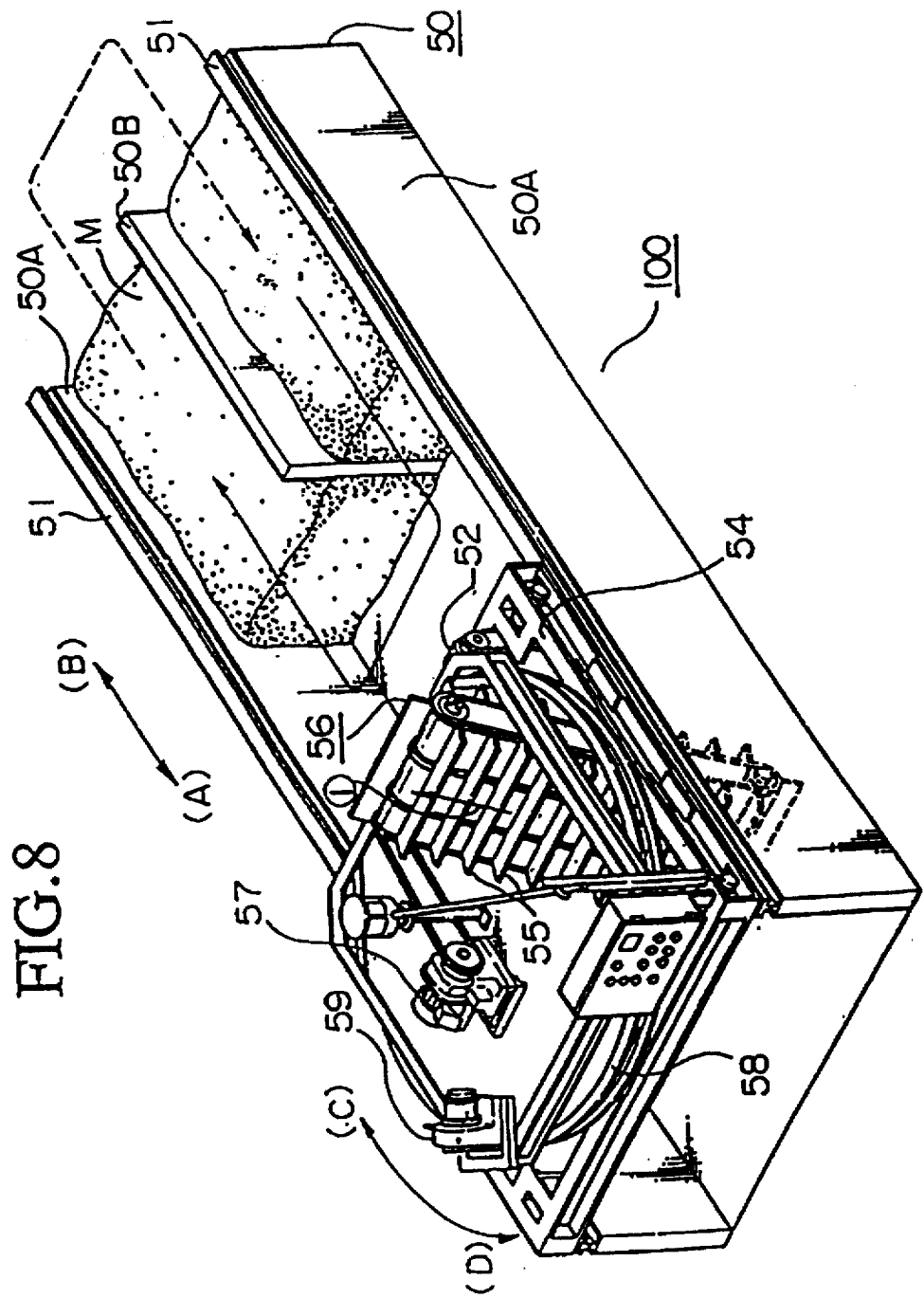
FIG. 8 is a perspective view of a conventional waste decomposition treatment apparatus.

Additionally, as shown in FIG. 7, a pressure receiving plate 22 for converting the load of the organic waste M, which has been churned and transported to the back side of the direction of advancement, into advancement force for the agitator 5 may be installed on the agitator 5.

In this case, the upper end portion 23 of the pressure receiving plate 22, installed near the upper sprockets 6 on the agitator, functions as the push-down scraper 21. As a result, all of the organic waste M which is removed from the agitation vanes 17 by contacting the upper end portion 23 of the pressure receiving plate 22 drops onto the pressure receiving plate 22 and gradually drops to a bottom portion of the reservoir vat 2 as the pressure receiving plate 22 advances with the agitator 5 so as to prevent hardening of the organic waste M due to rapid accumulation after agitation. Thus, the efficiency for agitation fermentation is increased.

The angle of attachment of the contact members 19 with respect to the agitation vanes 17 is not necessarily restricted to be a right angle.

Additionally, the shape of the flight members 10 is not restricted to that shown in the drawings. For example, the contact members may be made of any protruding shape aside from a flange shape, as long as they are able to contact the extension scrapers 18.

The loop is not necessarily restricted to being a chain 8, and it is possible to use a belt or the like as well.

What is claimed is:

1. An organic waste decomposition treatment apparatus comprising:
  a reservoir vat for storing organic waste; and
  an agitator within said reservoir vat, the agitator for moving within said reservoir vat and churning organic waste which has been conveyed to said reservoir vat for fermentation; said agitator comprising pairs of mutually spaced sprockets, loop members wrapped around said sprockets, and flight members rotatably attached to said loop members at a plurality of locations along the rotational circumference of said loop members by shafts which are parallel to a rotational axis of said loop members; said flight members comprising agitation vanes for churning said organic waste by extending outwards from said loop members, and contact members affixed at an angle to said agitation vanes;

wherein, during rotation of said loop members, said contact members contact extension scrapers positioned inside a circuit path of said flight members at a front side with respect to a direction of advancement of said agitator so as to rotate and force said agitation vanes outward, and said agitation vanes contact a push-down scraper positioned outside a circuit path of said flight members at a location aside from a front side of a direction of advancement of said agitator so as to rotate and push down said agitation vanes inside said circuit path.

2. An organic waste decomposition treatment apparatus according to claim 1, wherein said loop members are wrapped around said sprockets and rotated about a horizontal axis, so that said organic waste at a front side with respect to said direction of advancement is churned up and conveyed to a back side with respect to said direction of advancement.

3. An organic waste decomposition treatment apparatus according to claim 2, further comprising a pressure receiving plate attached at a back end of said agitator with respect to the direction of advancement, which tilts downward from a front side to a back side of the direction of advancement, for receiving organic waste churned up by said agitator and transported to a back end of the direction of advancement, so as to convert a load force imposed by the organic waste into advancement force for said agitator.

4. An organic waste decomposition treatment apparatus according to claim 3, wherein said push-down scraper comprises a forward end portion of said pressure receiving plate.

5. An organic waste decomposition treatment apparatus according to claim 1, wherein said loop members comprise a mutually parallel pair of chains, said agitation vanes are attached between said chains at a plurality of locations mutually spaced along the rotational circumference of said chains, and connector panels are attached between said chains in the spaces between said agitation vanes.

\* \* \* \* \*